United States Patent
Hasegawa et al.

(10) Patent No.: US 7,456,352 B1
(45) Date of Patent: Nov. 25, 2008

(54) SYSTEM OF ELECTRONIC MUSICAL INSTRUMENT AND MOBILE WIRELESS TERMINAL SET

(75) Inventors: Yutaka Hasegawa, Hamamatsu (JP); Takashi Kunii, Hamamatsu (JP); Kosei Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 112 days.

(21) Appl. No.: 09/672,908

(22) Filed: Sep. 28, 2000

(30) Foreign Application Priority Data

Sep. 28, 1999 (JP) ............................. 11-274476

(51) Int. Cl.
*G10H 1/00* (2006.01)

(52) U.S. Cl. ..................... 84/600; 84/601; 84/609; 84/645; 84/650

(58) Field of Classification Search ........... 84/600–606, 84/609–610, 615, 616, 622–625, 634, 645, 84/649–650, 653–654, 659–660, 666
See application file for complete search history.

(56) References Cited

U.S. PATENT DOCUMENTS

| | | | |
|---|---|---|---|
| 5,563,359 A | 10/1996 | Okamura | |
| 6,069,310 A * | 5/2000 | James | 84/645 |
| 6,366,791 B1 * | 4/2002 | Lin et al. | 455/567 |
| 6,381,452 B1 * | 4/2002 | Tien et al. | 455/344 |
| 6,911,592 B1 * | 6/2005 | Futamase et al. | 84/622 |
| 2002/0178137 A1 * | 11/2002 | Hasegawa | 707/1 |

FOREIGN PATENT DOCUMENTS

| | | |
|---|---|---|
| JP | A-8-106282 | 4/1996 |
| JP | A-9-26798 | 1/1997 |
| JP | 10-93665 | 4/1998 |
| JP | A-11-215249 | 8/1998 |
| JP | 11-88965 | 3/1999 |
| JP | A-11-146092 | 5/1999 |
| JP | 11-155026 | 6/1999 |
| JP | 11-203217 | 7/1999 |

* cited by examiner

*Primary Examiner*—Marlon Fletcher
(74) *Attorney, Agent, or Firm*—Morrison & Foerster LLP

(57) ABSTRACT

An electronic musical instrument is constructed to treat music information associated to music tones, and can be coupled to a mobile wireless terminal set communicable with a public communication network. In the electronic musical instrument, a main block processes music information for generation of music tones, the processed music information being transferable for effecting remote generation of the music tones. A memory block is controlled for memorizing music information. A control block controls the memory block to memorize the processed music information and to feed the memorized music information to the mobile wireless terminal set for transfer of the music information through the public communication network. Further, the control block feeds music information received by the mobile wireless terminal set through the public communication network to the memory block, and controls the memory block to memorize therein the fed music information. The main block processes the memorized music information for generation of music tones.

107 Claims, 6 Drawing Sheets

SYSTEM OF ELECTRONIC MUSICAL INSTRUMENT AND MOBILE WIRELESS TERMINAL SET

BACKGROUND OF THE INVENTION

1. Field of the Invention

The present invention relates generally to an electronic musical instrument connected to a public communications network, a mobile wireless terminal set having an electronic musical instrument capability, and a mobile wireless terminal set having an electronic musical instrument remote control capability.

2. Description of Related Art

Some electronic musical instruments have a communications interface such as MIDI (Musical Instrument Digital Interface), RS232C, RS422, 10/100 BASE-T, USB (Universal Serial Bus), and IEEE 1394. These interfaces allow two or more electronic musical instruments to constitute a LAN (Local Area Network). However, this LAN is nothing but a communications network dedicated to the interconnection among the electronic musical instruments compliant with a particular communications standard; namely, the LAN does not base on a universal communications standard. There has been no networking method that facilitates the interconnection of two or more electronic musical instruments.

Some electronic musical instruments are controlled remotely. For the remote control, these musical instruments require dedicated remote control devices. Each of these devices is of stand-alone type and therefore cannot control other electronic musical instruments.

SUMMARY OF THE INVENTION

It is therefore an object of the present invention to provide an electronic musical instrument or a mobile wireless terminal set having an electronic musical instrument capability, that can be easily connected to a public communications network for effective use of music information stored in database servers.

It is another object of the present invention to provide a mobile wireless terminal set having a remote control capability that can remotely control electronic musical instruments connected to a public communications network, and that can download information necessary for the remote control.

An inventive electronic musical instrument is constructed to treat music information associated to music tones, and can be coupled to a mobile wireless terminal set communicable with a public communication network. In the electronic musical instrument, a main block processes music information for generation of music tones, the processed music information being transferable for effecting remote generation of the music tones. A memory block is controlled for memorizing music information. A control block controls the memory block to memorize the processed music information and to feed the memorized music information to the mobile wireless terminal set for transfer of the music information through the public communication network.

Preferably, the electronic musical instrument has a card slot provided for receiving therein a data communication card such that the mobile wireless terminal set is detachably coupled to the received data communication card by a connection cable. Otherwise, the electronic musical instrument has a card slot provided for receiving therein a card type of the mobile wireless terminal set such that the mobile wireless terminal set is detachably coupled to the card slot. Otherwise, the electronic musical instrument has a connector provided for engagement with another connector provided in the mobile wireless terminal set such that the mobile wireless terminal set is detachably coupled to the connector. Otherwise, the electronic musical instrument has a space portion provided for integrally accommodating therein the mobile wireless terminal set such that the mobile wireless terminal set is detachably coupled to the space portion. Specifically, the electronic musical instrument treats music information containing at least one of music tone information that characterizes the music tones, music control information that controls the generation of the music tones and music performance information that specifies a performance by the music tones.

An inventive electronic musical instrument is constructed to treat music information associated to music tones, and can be coupled to a mobile wireless terminal set communicable with a public communication network. In the electronic musical instrument, a memory block is controlled for memorizing music information. A control block feeds music information received by the mobile wireless terminal set through the public communication network to the memory block, and controls the memory block to memorize therein the fed music information. A main block processes the memorized music information for generation of music tones.

An inventive electronic musical instrument is constructed to treat music information associated to music tones, and can be coupled to a mobile wireless terminal set communicable with a public communication network. In the electronic musical instrument, a main block processes music information for generation of music tones, the processed music information being transferable for effecting remote generation of the music tones. A coupling block is coupled to the mobile wireless terminal set. A control block controls the coupling block to feed the processed music information from the main block to the mobile wireless terminal set for transfer of the music information through the public communication network.

An inventive electronic musical instrument is constructed to treat music information associated to music tones, and can be coupled to a mobile wireless terminal set communicable with a public communication network. In the electronic musical instrument, a coupling block is coupled to the mobile wireless terminal set which can receive music information through the public communication network. A memory block can receive and memorize the music information outputted from the coupling block. A main block can process the memorized music information for generation of music tones.

An inventive mobile wireless terminal set is connectable to an electronic musical instrument which treats music information associated to music tones. In the mobile wireless terminal set, a communication block can communicate with a public communication network by a wireless line to receive music information from the public communication network. A coupling block is coupled to the electronic musical instrument. A control block passes the music information received by the communication block to the electronic musical instrument through the coupling block, whereby the electronic musical instrument can process the passed music information for generation of music tones.

An inventive mobile wireless terminal set is connectable to an electronic musical instrument which outputs music information usable for generation of music tones. In the mobile wireless terminal set, a coupling block is coupled to the electronic musical instrument. A memory block receives and memorizes the music information outputted by the electronic musical instrument through the coupling block. A communication block can communicate with a public communication network by a wireless line to transmit the memorized music information to the public communication network for remote generation of music tones according to the transmitted music information.

An inventive system comprises an electronic musical instrument which treats music information associated to music tones, and a mobile wireless terminal set which can transfer music information through a public communication network. The electronic musical instrument comprises a main block that processes music information for generation of music tones, the processed music information being transferable for effecting remote generation of the music tones, a coupling block that is used for coupling with the mobile wireless terminal set, and a control block that controls the coupling block to feed the processed music information from the main block to the mobile wireless terminal set. The mobile wireless terminal set comprises a coupling block that is used for the coupling with the electronic musical instrument, a memory block that receives and memorizes the music information fed from the electronic musical instrument through the coupling block, and a communication block that can communicate with the public communication network by a wireless line to transmit the memorized music information to the public communication network for remote generation of music tones according to the transmitted music information.

An inventive system comprises a mobile wireless terminal set which can acquire music information from a public communication network, and an electronic musical instrument which can treat music information associated to music tones. The mobile wireless terminal set comprises a communication block that can communicate with the public communication network by a wireless line to acquire music information from the public communication network, a coupling block that is used for coupling to the electronic musical instrument, and a control block that passes the music information acquired by the communication block to the electronic musical instrument through the coupling block. The electronic musical instrument comprises a coupling block that is used for coupling to the mobile wireless terminal, a memory block that can receive and memorize the passed music information through the coupling block, and a main block that can process the memorized music information for generation of music tones.

An inventive mobile wireless terminal set can communicate with a public communication network, and can treat music information associated to music tones. In the mobile wireless terminal set, a communication block can communicate with the public communication network by a wireless line. A musical instrument block processes music information to generate music tones. A control block controls the musical instrument block to pass the processed music information to the communication block, and controls the communication block to transmit the passed music information to the public communication network for remote generation of the music tones according to the transmitted music information.

An inventive mobile wireless terminal set can communicate with a public communication network, and can treat music information associated to music tones. In the mobile wireless terminal set, a communication block can communicate with the public communication network by a wireless line to acquire music information from the public communication network. A musical instrument block processes music information to generate the music tones. A control block controls the communication block to pass the acquired music information to the musical instrument block, and controls the musical instrument block to generate the music tones according to the passed music information.

An inventive mobile wireless terminal set can execute a remote control over functions of an electronic musical instrument through a public communication network. In the mobile wireless terminal set, a communication block can connect with the public communication network by a wireless line to transmit information. A first control can be manipulated to generate first control information effective to control the communication block. A setting block allocates a function of the electronic musical instrument to the first control. A converting block converts the first control information generated by the manipulation of the first control into second control information, which is equivalent to control information generated by a second control equipped in the electronic musical instrument for controlling of the function of the electronic musical instrument. A control block controls the communication block to direct the second control information to the electronic musical instrument through the public communication network, thereby executing the remote control of the function of the electronic musical instrument by means of the first control.

An inventive mobile wireless terminal set can execute a remote control over functions of an electronic musical instrument through a public communication network. In the mobile wireless terminal set, a communication block can connect with the public communication network by a wireless line to receive and transmit information. A first control can be manipulated to generate first control information effective to control the communication block. A control block controls the communication block to acquire allocation information representing allocation of a function of the electronic musical instrument to a second control equipped in the electronic musical instrument. A setting block allocates the function of the electronic musical instrument to the first control according to the acquired allocation information, thereby enabling the remote control of the function of the electronic musical instrument by means of the first control through the public communication network.

An inventive electronic musical instrument is constructed to treat music information associated to music tones, and can be coupled to a mobile wireless terminal set communicable with a public communication network. In the electronic musical instrument, a coupling block is coupled to the mobile wireless terminal set which can download music information from a database server through the public communication network. A memory block can receive and store the downloaded music information outputted from the coupling block. A main block can process the memorized music information for generation of music tones.

An inventive electronic musical instrument is constructed to treat music information associated to music tones, and can be coupled to a mobile wireless terminal set communicable with a public communication network. In the electronic musical instrument, a main block can process music information for generation of music tones. A memory block stores the processed music information. A coupling block is coupled to the mobile wireless terminal set which can be connected to a database server through the public communication network. A control block controls the memory block to pass the stored music information to the coupling block, and controls the coupling block to upload the passed music information to the database server by the mobile wireless terminal set through the public communication network.

An inventive system comprises an electronic musical instrument that treats music information associated to music tones, a mobile wireless terminal set that can be coupled to the electronic musical instrument and that can communicate with a public communication network, and a database server that stores music information and that can be accessed by the mobile wireless terminal set through the public communication network. In the system, the electronic musical instrument comprises a coupling block that is coupled to the mobile wireless terminal set which can download the music information from the database server through the public communication network, a memory block that can receive and store the downloaded music information outputted from the coupling block, and a main block that can process the memorized music information for generation of music tones.

An inventive system comprises an electronic musical instrument that treats music information associated to music tones, a mobile wireless terminal set that can be coupled to the electronic musical instrument and that can communicate with a public communication network, and a database server that is connected to the public communication network for serving music information to the public communication network. In the system, the electronic musical instrument comprises a main block that can process music information for generation of music tones, a memory block that stores the processed music information, a coupling block that is coupled to the mobile wireless terminal set, and a control block that controls the memory block to pass the stored music information to the coupling block and that controls the coupling block to upload the passed music information to the database server by the mobile wireless terminal set through the public communication network.

An inventive electronic musical instrument is constructed to treat music information associated to music tones, and can be coupled to a mobile wireless terminal set communicable with a public communication network. In the electronic musical instrument, a coupling block is coupled to the mobile wireless terminal set which can access to another electronic musical instrument storing music information through the public communication network. A control block controls the coupling block to enable the mobile wireless terminal set to download the music information from said another electronic musical instrument. A memory block stores the downloaded music information outputted from the coupling block. A main block can process the stored music information for generation of music tones.

An inventive electronic musical instrument is constructed to treat music information associated to music tones, and can be coupled to a mobile wireless terminal set communicable with a public communication network. In the electronic musical instrument, a main block can process music information for generation of music tones. A memory block stores the processed music information. A coupling block is coupled to the mobile wireless terminal set which is in turn connected to another electronic musical instrument through the public communication network. A control block controls the memory block to pass the stored music information to the coupling block, and controls the coupling block to upload the passed music information to said another electronic musical instrument by the mobile wireless terminal set through the public communication network.

An inventive system comprises a first electronic musical instrument that treats music information associated to music tones, a mobile wireless terminal set that can be coupled to the first electronic musical instrument and that can communicate with a public communication network, and a second electronic musical instrument that stores music information and that can be accessed by the mobile wireless terminal set through the public communication network. In the inventive system, the first electronic musical instrument comprises a coupling block that is coupled to the mobile wireless terminal set which can download the music information from the second electronic musical instrument through the public communication network, a memory block that can receive and store the downloaded music information outputted from the coupling block, and a main block that can process the stored music information for generation of music tones.

An inventive system comprises a first electronic musical instrument that treats music information associated to music tones, a mobile wireless terminal set that can be coupled to the first electronic musical instrument and that can communicate with a public communication network, and a second electronic musical instrument that is connected to the public communication network. In the inventive system, the first electronic musical instrument comprises a main block that can process music information for generation of music tones, a memory block that stores the processed music information, a coupling block that is coupled to the mobile wireless terminal set, and a control block that controls the memory block to pass the stored music information to the coupling block and that controls the coupling block to transfer the passed music information to the second electronic musical instrument by the mobile wireless terminal set through the public communication network.

An inventive mobile wireless terminal set is connectable to an electronic musical instrument which outputs music information usable for generation of music tones. In the mobile wireless terminal set, a coupling block is coupled to the electronic musical instrument to receive therefrom the music information. A memory block memorizes the music information received by the coupling block. A converting block converts the memorized music information into a format suitable for transfer by a wireless line. A communication block can communicate with a public communication network by a wireless line to transfer the converted music information to the public communication network.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

Figure 1:
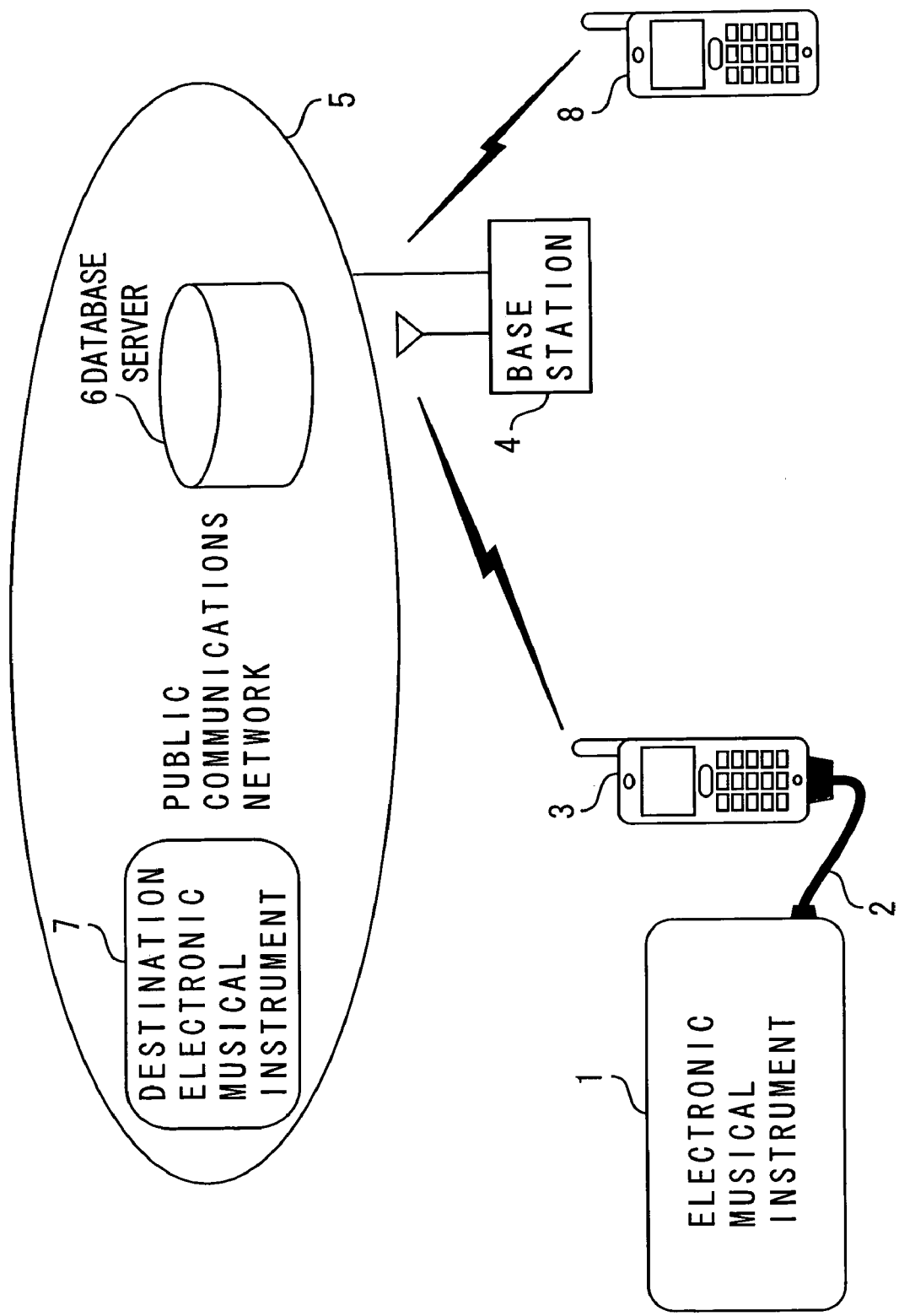
FIG. 1 is a schematic diagram illustrating a communications network for describing the embodiments of an electronic musical instrument and a mobile wireless terminal set according to the invention.

Now, referring to FIG. 1, there is shown a diagram of communications network connection for describing a system of an electronic musical instrument and a mobile wireless terminal set according to the invention. In the figure, reference numeral 1 denotes an electronic musical instrument. Reference numeral 2 denotes a connection cable. Reference numeral 3 denotes a portable telephone terminal. Reference numeral 4 denotes a base station. Reference numeral 5 denotes a public communications network. Reference numeral 6 denotes a database server. Reference numeral 7 denotes a destination electronic musical instrument. Reference numeral 8 denotes another portable telephone terminal for operating a remote electronic musical instrument.

A personal computer may be connected to a portable telephone terminal by a so-called data communications card. The electronic musical instrument 1 has a coupling block in the form of a card slot into which the data communications card is loaded. The loaded data communications card is detachably connected to the portable telephone terminal 3 by the connection cable 2. Instead of the data communications card, a dedicated adapter may be used. Alternatively, the electronic musical instrument 1 and the portable telephone terminal 3 may be interconnected simply by the cable 2.

In the example shown, the mobile communications terminal set 3 is composed of a portable telephone terminal of cellular type. Instead of a cellular phone, a PHS (Personal Handyphone System) may be used.

The portable telephone terminal 3 is wirelessly connected to the base station 4, which in turn is connected to the public communications network 5 such as a subscriber telephone network. The public communications network 5 is connected to the database server 6 and the destination electronic musical instrument 7 directly or indirectly. The destination electronic musical instrument 7 on the public communications network is connected to the electronic musical instrument 1 by originating a call from the portable telephone terminal 3 in advance. If the electronic musical instrument 1 has a keyboard, the user operates keys of the keyboard to generate music performance information. According to this music performance information, a tone signal is generated for sounding from a speaker for example. At the same time, the music performance information is converted into a MIDI message along with music tone information and music control information to be supplied to the destination electronic musical instrument 7 through the portable telephone terminal 3, the base station 4, and the public communications network 5. On the basis of the received music performance information and so on, the destination electronic musical instrument 7 generates a music tone signal. Alternatively, the electronic musical instrument 1 may be connected to the database server 6 on the public communications network 5 to upload and store the music performance information and so on in the database server 6.

It should be noted that the destination electronic musical instrument 7 is not always connected to the public communications network through the portable telephone terminal 3 as with the electronic musical instrument 1. The destination electronic musical instrument 7 may be connected to a subscriber telephone network through a modem. If the database server 6 is connected to a general-purpose network such as the Internet, the portable telephone terminal 3 may access the database server 6 by executing normal dial-up connection for a internet provide provider on the public communications network 5. Therefore, the public communications network 5 is not substantially restricted to the scope of a subscriber telephone network.

The electronic musical instrument 1 also originates a call through the portable telephone terminal 3 or is called to receive the music information such as music tone information, music control information, and music performance information from the destination electronic musical instrument 7 on the public telephone network 6 in the form of MIDI messages through the portable telephone terminal 3. On the basis of the received information, the electronic musical instrument 1 can set or change parameters of an internal main block including a music tone signal generating block to generate a music tone signal according to the music performance information, thereby sounding the generated music tone signal from a speaker for example.

The electronic musical instrument 1 makes the portable telephone terminal 3 originate a call by dialing to connect to the database server 6, and to download the music information such as music tone information, music control information, and music performance information from the database 6. On the basis of the downloaded information, the electronic musical instrument 1 initialize or change parameters of the music tone signal generating block. Conversely, the electronic musical instrument 1 can upload the music information to the database server 6.

Thus, without using a dedicated communication device or a dedicated LAN, the electronic musical instrument 1 can transfer the music information such as music tone information, music control information, and music performance information with the destination electronic musical instrument 7 and the database server 6 through the portable telephone terminal 3 and the public communications network 5.

On the other hand, the other portable telephone terminal 8 is used to remotely control the electronic musical instrument by operating controls arranged on this telephone terminal. For this purpose, the portable telephone terminal 8 stores remote control information.

A capability or function to be executed by operating controls of the electronic musical instrument, for example, a timbre selecting capability, is executed as follows. Namely, if timbre selection is to be executed by varying an operation amount of a certain control, this control is assigned to a particular control arranged on the portable telephone terminal 8, and the operating amount of the control on the electronic musical instrument is remotely controlled by the particular control on the portable telephone terminal 8.

In this case, the control arranged on the electronic musical instrument may output the operation amount in the form of a rotational amount. On the other hand, the particular control arranged on the portable telephone terminal may output a corresponding operation amount in the form of click times if the control is composed of a push-button for example.

The operating information generated by the controls arranged on the electronic musical instrument includes music performance information generated by performance controls such as a keyboard, music tone information and music control information generated by setting controls, and functional control information generated by such controls for controlling the functions of the entire electronic musical instrument as power on/off switches, mode selector switch, automatic performance start switch, and a volume control.

The database server 6 stores the remote control information for assigning or allocating the capabilities to be executed by the controls arranged on the electronic musical instrument to the controls arranged on the portable telephone terminal 8.

The portable telephone terminal 8 originates a call to connect to the database server 6 on the public communications network 5 through the base station 4. When connected, the portable telephone terminal 8 sends a predetermined command to the database server 6 to download therefrom the remote control information such as function allocation information in the form of switch exclusive data, one of MIDI messages, and store the downloaded information.

Next, the user originates a call through the dial operation of the portable telephone terminal 8 to connect to the destination electronic musical instrument 7 on the public communications network 5. Then, the user switches the portable telephone terminal 8 to the remote control mode and operates the equipped controls to remotely operate the destination electronic musical instrument 7.

In the above-mentioned example, the remote control information is downloaded from the database server 6. It will be apparent that the remote control information may be downloaded from the destination electronic musical instrument 7.

Thus, with the portable telephone terminal 8 used as a remote control commanding device, plural unspecified electronic musical instruments can be remotely operated via a public communications network. In addition, because the portable telephone terminal 8 is a wireless terminal, the user can move substantially anywhere. Communication via the public communications network 5 does not necessarily mean that the user operates an electronic musical instrument located remotely. In some cases, the portable telephone terminal 8 and the destination electronic musical instrument 7 may exist on a common performance stage. It is apparent that the portable telephone terminal 8 can remotely control the other electronic musical instrument 1 by acquiring the remote control information such as the function allocation information specific to the electronic musical instrument 1.

Figure 2:
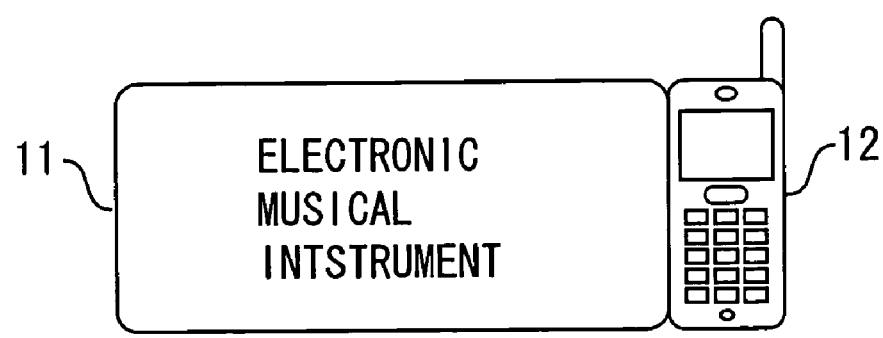
FIGS. 2(a), 2(b), 2(c), and 2(d) are diagrams illustrating electronic musical instruments and portable telephone terminals that replace the combination of the electronic musical instrument and the mobile wireless terminal set shown in FIG. 1.
Figure 2:
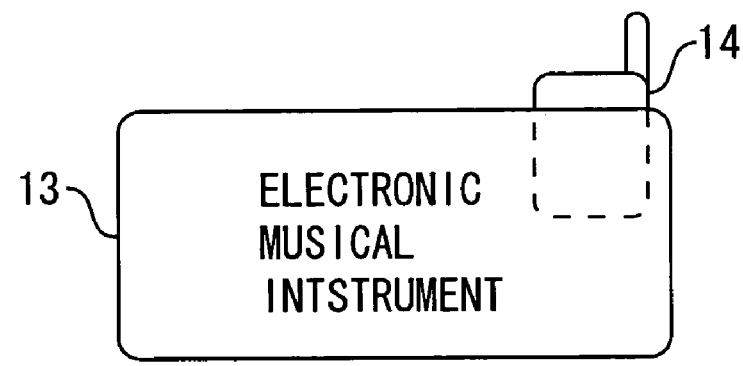
Figure 2:
Figure 2:
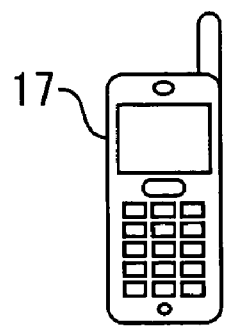

FIGS. 2(*a*), 2(*b*), 2(*c*), and 2(*d*) illustrate electronic musical instruments and portable telephone terminals associated with other examples of the combination of the electronic musical instrument 1 and the portable telephone terminal 3 shown in FIG. 1.

FIG. 2(*a*) illustrates an example in which an electronic musical instrument 11 and a portable telephone terminal 12 are detachably connected with each other by means of a pair of connectors provided respectively to the electronic musical instrument 11 and the portable telephone terminal. When the portable telephone terminal 12 is detached, the terminal 12 becomes a stand-alone portable telephone terminal.

FIG. 2(*b*) illustrates an example in which a card-type portable telephone terminal 14 is detachably inserted in a coupling block composed of a card slot of an electronic musical instrument 13. This portable telephone terminal 14 may not have a telephone communication capability and/or a dial operation capability. If no dial operation capability is provided, a dial operation is executed by use of corresponding controls arranged on the electronic musical instrument 13.

FIG. 2(*c*) illustrates an example in which a portable telephone terminal 16 is accommodated into a space portion of an electronic musical instrument 15.

FIG. 2(*d*) illustrates an example in which an electronic musical instrument capability implemented by a music instrument unit including a tone generating LSI is installed in the body of a portable telephone terminal 17. Because of a small body size and the small number of controls, the capability as an electronic musical instrument is restricted. To reduce this restriction as far as possible, additional controls for the electronic musical instrument may be arranged on a cover of the body.

Performance made by operating the controls of the portable telephone terminal 17 may be heard through a built-in speaker or a headphone. In addition, the music performance information may be sent real-time to the destination electronic musical instrument 7 for example through the public communications network 5. Moreover, music information may be downloaded from the database server 6 for example, and the portable telephone terminal 17 may process the downloaded music information to carry out automatic performance by means of the installed music instrument unit. Further, as with the remote operating portable telephone terminal 8 shown in FIG. 1, the portable telephone terminal 17 can be utilized as a remote operating portable telephone terminal.

Figure 3:
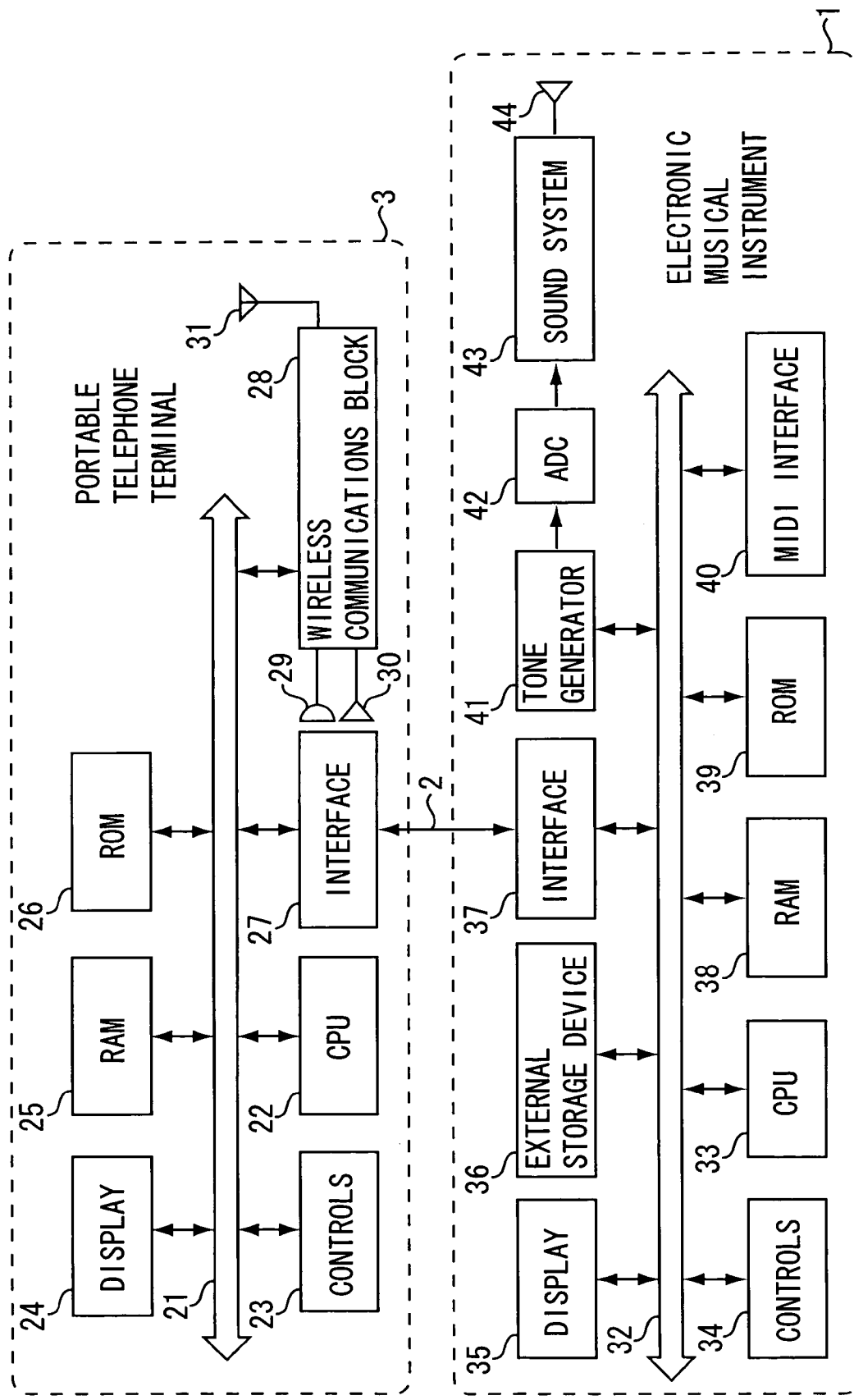
FIG. 3 is a block diagram illustrating one example of the internal configuration of the combination of the electronic musical instrument and the mobile wireless terminal set shown in FIG. 1.

Referring to FIG. 3, there is shown a block diagram illustrating an exemplary internal configuration of the combination of the electronic musical instrument 1 and the portable telephone terminal 3 shown in FIG. 1.

In the figure, on the side of the portable telephone terminal 3, reference numeral 21 denotes a bus line, reference numeral 22 denotes a CPU (Central Processing Unit) serving as a control block, reference numeral 23 denotes various controls, reference numeral 24 denotes a display, reference numeral 25 denotes a RAM (Random Access Memory), reference numeral 26 denotes a ROM (Read Only Memory), reference numeral 27 denotes an interface, reference numeral 28 denotes a wireless communications block, reference numeral 29 denotes a transmitter, reference numeral 39 denotes a receiver, and reference numeral 31 denotes an antenna.

On the side of the electronic musical instrument 1, reference numeral 32 denotes a bus line, reference numeral 33 denotes a CPU serving as a control block, reference numeral 34 denotes various controls, reference numeral 35 denotes a display, reference numeral 36 denotes an external storage device, reference numeral 37 denotes an interface, reference numeral 38 denotes a RAM, reference numeral 39 denotes a ROM, reference numeral 40 denotes a MIDI interface, reference numeral 41 denotes a tone generator LSI, reference numeral 42 denotes a DA converter, reference numeral 43 denotes a sound system, and reference numeral 44 denotes a speaker.

The detailed configuration of the electronic musical instrument 1 depends on whether the electronic musical instrument is a keyboard electronic musical instrument, a tone generator, a sequencer, an automatic rhythm device, or an automatic accompaniment device. If the tone generator LSI 41 is provided as a main block of the electronic musical instrument, music tone signals can be generated in response to a manual performance operation real-time. It should be noted that the electronic musical instrument may also be an effector for manipulating inputted tones or a mixer for synthesizing plural tones and outputting a synthesized tone. In this case also, the electronic musical instrument may incorporate the capability of monitoring manipulated or synthesized tones.

The above-mentioned system configuration is characterized by that the electronic musical instrument 1 and the mobile telephone terminal 3 exchanges and transfers data through the interface 27, the cable 2, and the interface 37. The following describes an operation of the electronic musical instrument 1 and the mobile telephone terminal 3 with reference to FIG. 3.

First, the operation of the electronic musical instrument as a stand-alone device will be described. The CPU 33 controls the electronic musical instrument 1 in its entirety and controls the interface with the portable telephone terminal 3. The RAM 38 is used as a work area and a memory block for storing various programs and information. The ROM 39 stores various programs such as performance processing programs and various kinds of control information.

The MIDI interface 40 interfaces the transfer of MIDI events with external MIDI devices. The external storage device 36 is a drive for accessing recording media such as CD-ROM (Compact Disc Read Only Memory), HD (Hard Disc), and FD (Floppy Disc).

The tone generator 41 is composed of a waveform memory type that generates music tone signals by reading waveform data stored in its internal memory, the ROM 39, the external storage device, or other recording media. In addition to the tone generating capability, the tone generator 41 may have a capability of imparting effects such as reverberation, chorus, and variation. The DA converter 42 converts music tone signal generated by the tone generator 41 into an analog signal, which is supplied to the sound system 43 for sounding.

The bus line 32 circulates and transfers data between the above-mentioned blocks of the electronic musical instrument.

As instructed by the various control programs loaded into the RAM 38, the CPU 33 executes various control operations according to the inputs from the controls 34 and the MIDI interface 40. In performance, the CPU 33 controls the tone generating states of sounding channels of the tone generator 41 according to the music performance information supplied from the keyboard controls, the MIDI interface 40, and the external storage device 36.

For example, when a note-on signal is inputted, the CPU 33 assigns the occurrence of that tone to one of the sounding channels of the tone generator 41. The CPU 33 then supplies, to the assigned sounding channel, music tone information (for example, pitch information, waveform select information, and volume envelope control information) and music control information (for example, vibrato control information, effect information, and so on) and, at the same time, issues a command for starting sounding. In response, the tone generator 41, by use of the assigned sounding channel and by use of the tone waveform data read from one of the memories according to the waveform select information, generates a music tone signal corresponding to the above-mentioned music tone information.

The following describes an operation of the mobile telephone terminal 3 when it is used in a stand-alone manner. The CPU 22 controls the mobile telephone terminal 3 in its entirety and controls the interface with the electronic musical instrument 1. A control program is stored in the ROM 26 and operates by providing a work area and a buffer area in the RAM 25. The wireless communications block 28 executes a call setting procedure in a wireless manner under the control of the CPU 22. When the connecting operation has been completed, the CPU 22 digitizes a voice signal supplied from the transmitter 29, modulates the digital voice signal, and outputs the modulated voice signal from the antenna 31. At the same time, the CPU 22 demodulates a signal received at the antenna 31 into an analog signal and outputs the resultant analog voice from the receiver 30.

The electronic musical instrument 1 and the portable telephone terminal 3 transfer data via the interface 37 and the interface 27 with each other. The RAM 38 and the RAM 25 provide buffers or memory blocks for the data transfer. As described with reference to FIG. 1, a data communications card may be used as the interface. In this case, the electronic musical instrument 1 and the portable telephone terminal 3 directly provide the interface for the data communications card; substantially, however, the data communications card provides the interface for the portable telephone terminal 3 or the electronic musical instrument 1 with which the data communications card executes communication.

Figure 4:
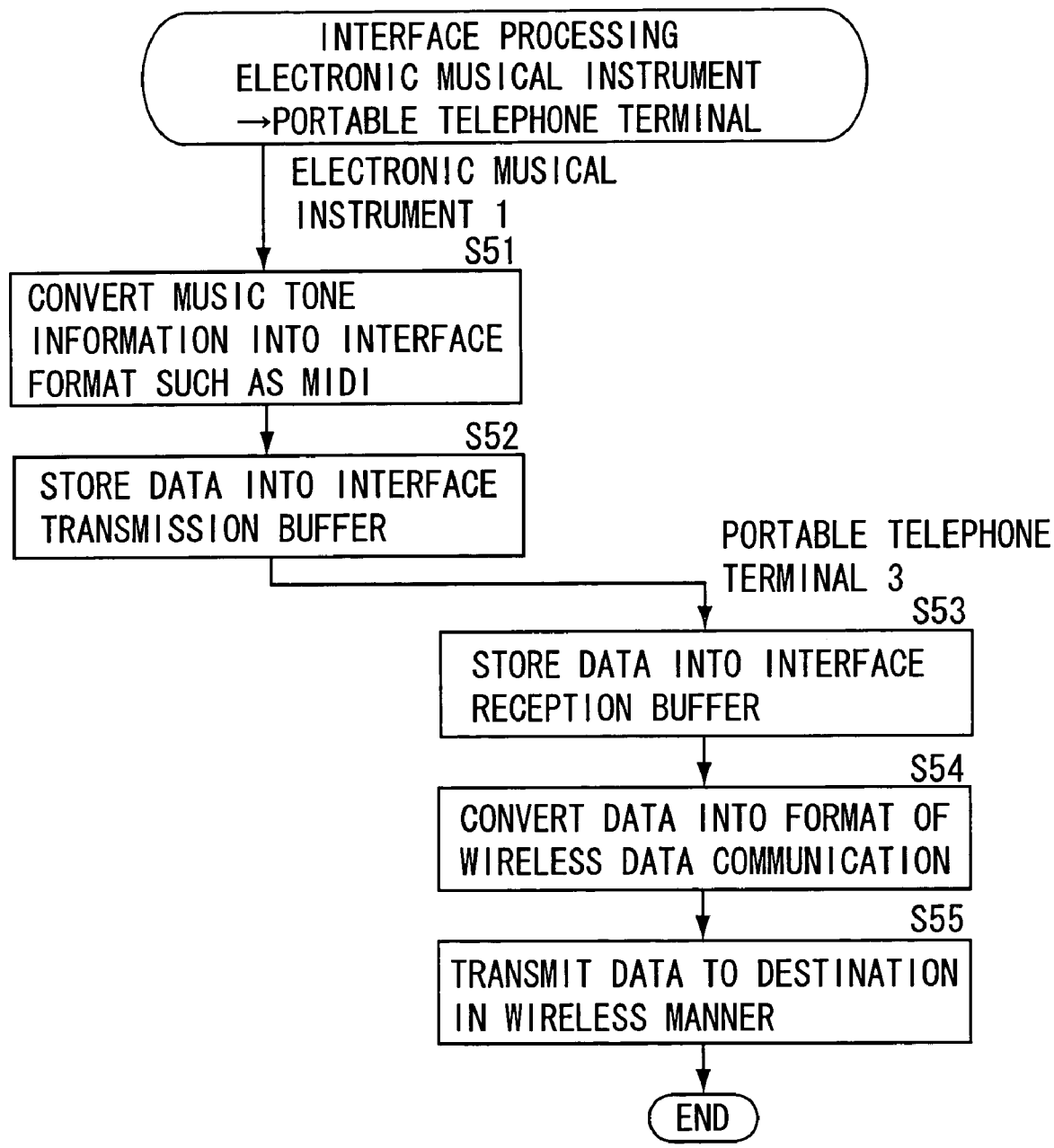
FIG. 4 is a flowchart for describing an interface processing operation for transferring data from the electronic musical instrument to the mobile wireless terminal set shown in FIG. 1.

This interface processing will be described with reference to FIGS. 4 and 5. FIG. 4 is a flowchart for describing an operation for transferring data from the electronic musical instrument 1 to the portable telephone terminal 3 in the interface processing. First, in step S51, on the side of the electronic musical instrument 1, music information such as music tone information, music control information, and music performance information is converted into an interface format such as a MIDI message. In step S52, the converted data are stored in an interface transmission buffer and the processing is shifted to the side of the mobile telephone terminal 3 through the interface. In step S53, the converted data are stored in an interface reception buffer. In step S54, the data are converted into a communications format suitable for wireless communication. In step S55, the data in the wireless communications format are transmitted to a destination by use of a predetermined communications control protocol in a wireless manner.

Figure 5:
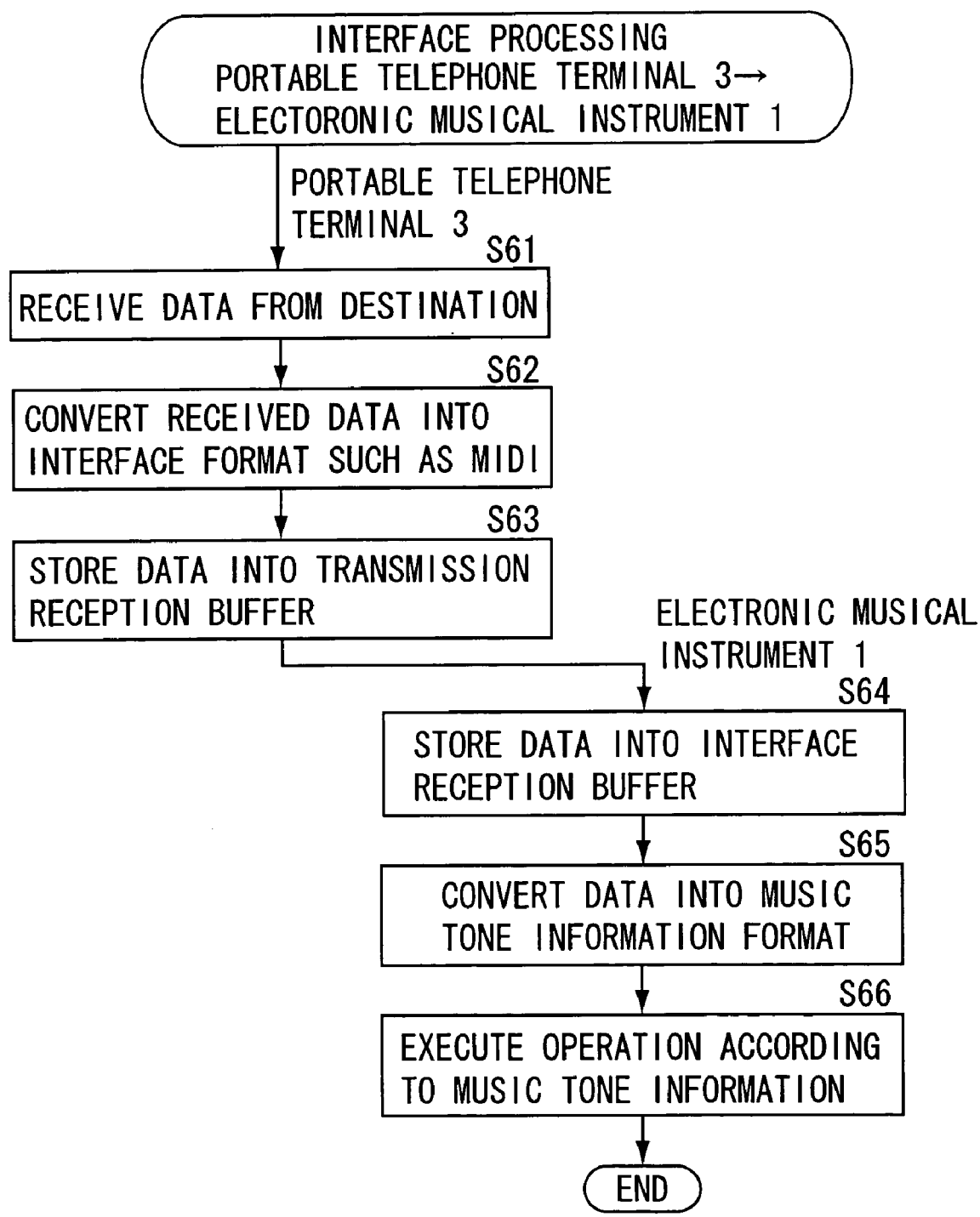
FIG. 5 is a flowchart for describing an interface processing operation for transferring data from the mobile wireless terminal set to the electronic musical instrument shown in FIG. 1.

FIG. 5 is a flowchart for describing an operation for transferring data from the portable telephone terminal 3 to the electronic musical instrument 1 in the interface processing. In step S61, on the side of the portable telephone terminal 3, data are received from the destination electronic musical instrument 7 or the database server 6. In step S62, the received data are converted into an interface format such as a MIDI message. In step S63, the converted data are stored in the interface transmission buffer and the processing is shifted to the electronic musical instrument 1. In step S64, the converted data are stored in the interface reception buffer. In step S65, the converted data are further converted into a format of music information. In step S66, a capability corresponding to the music tone information or the music control information is executed.

It should be noted that, in the above-mentioned interface processing, the portable telephone terminal 3 may be connected to the destination by dial operation beforehand. The portable telephone terminal 3 may also be connected every time data transfer is required. The data communication through a mobile telephone terminal is generally executed by line exchange but it is sometimes executed by packet exchange over a packet network.

When the connection is made to the public communications network 5 in the above-mentioned configuration, the database server 6 can be used as an external storage device of the electronic musical instrument 1. If the portable telephone terminal 3 has a broadcast communications capability, the music performance information can be transmitted concurrently to a plurality of destination electronic musical instruments.

In transmitting MIDI messages from the electronic musical instrument 1, the music tone information and music performance information associated with timbre and waveform can be transferred as MIDI messages to the destination electronic musical instrument 7 or the database server 6 in a bulk transfer mode. As for the music performance information, MIDI message can be transferred to the destination electronic musical instrument 7 in a streaming reproduction mode. Conversely, the same holds when transmitting MIDI messages from the electronic musical instrument 1. It should be noted that, when transferring music tone information not specified in the MIDI standard, the information can be transferred in the same manner by defining a predetermined format.

The transfer control program may be downloaded from the database server 6 or installed into the hard disc from a CD-ROM or like recording media.

The combinations of the electronic musical instrument and the portable telephone terminal shown in FIGS. 2(a) through 2(c) and the portable telephone terminal 17 shown in FIG. 2(d) may have configurations generally the same as that of the electronic musical instrument 1 and the portable telephone terminal 3 shown in FIG. 1. In the electronic musical instrument incorporating the mobile telephone terminal 16 shown in FIG. 2(c) or the mobile telephone terminal 17 incorporating the electronic musical instrument shown in FIG. 2(d), the electronic musical instrument unit and the mobile telephone terminal unit may be operated in an integrated manner by use of a common CPU, a common RAM, and a common ROM.

Otherwise, the section of the electronic musical instrument 1 and the section of the mobile telephone terminal 3 may be configured separately as shown in FIG. 3, and the data transfer, mutual operations, and synchronization operation may be controlled through the interface. This configuration allows the integrated operations of the existing LSI and control program of electronic musical instruments and the existing LSI and control program of portable telephone terminals without change or with minor changes. In this case, the interfaces 27 and 37 and the connection cable 2 need not be the same as those of the data communications card. Therefore, a new interface may be designed or these interfaces may be integrated into one interface.

The following describes the remote control processing by the portable telephone terminal 8 for remote operation shown in FIG. 1. The internal block configuration of the portable telephone terminal 8 for remote operation may be the same as the block configuration shown in FIG. 3 except that the interface 27 is removed from the configuration of the portable telephone terminal 3. In addition to the telephone mode, the portable telephone terminal is provided with the setting mode for downloading remote control information into the RAM 25 of the portable telephone terminal 3 and the remote control mode. These modes are switched by the user of the portable telephone terminal.

Figure 6A:
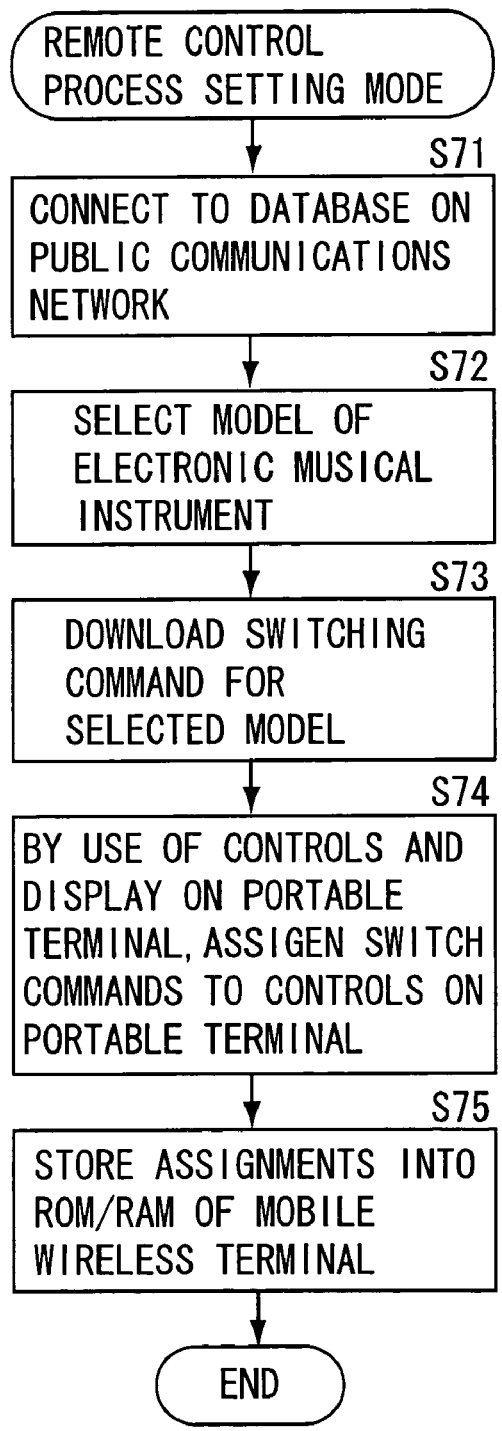
FIGS. 6(a) and 6(b) are flowcharts for describing a remote control processing operation of an electronic musical instrument by use of a portable telephone.
Figure 6B:
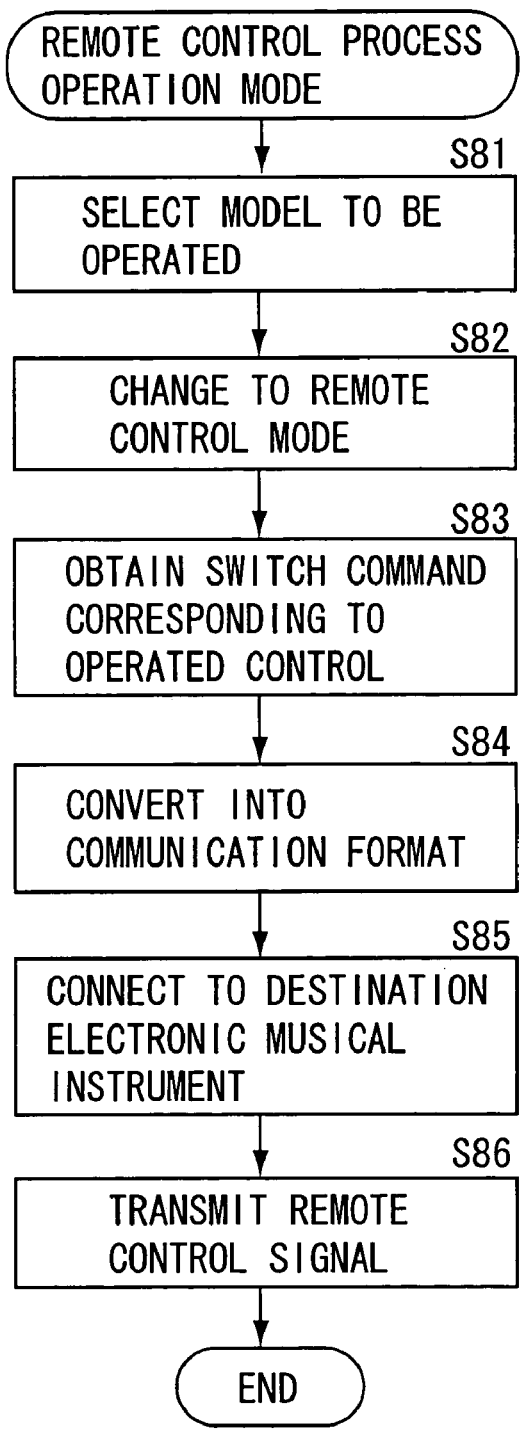

FIGS. 6(a) and 6(b) are flowcharts for describing the remote operation processing to be executed by the portable telephone terminal 8 for remote control of an electronic musical instrument. FIG. 6(a) is a flowchart for describing the setting mode, and FIG. 6(b) is a flowchart for describing the operation mode. In step S71 of FIG. 6(a), connection is made to the database server 6 (FIG. 1) on a public communications network by a dial operation. In step S72, the model of an electronic musical instrument to be remotely operated is selected. In step S73, a set of switch commands for the selected model is downloaded. For this switch command, an exclusive message, one of the MIDI messages, may be used.

In step S73, the user operates the controls and the display arranged on the portable telephone terminal 8 for remote operation to assign or allocate each switch command to each control on the portable telephone terminal 8 for remote operation. When the assignment has been completed, the user stores each switch command for each control on the portable telephone terminal 8 for remote operation into the RAM or the ROM of a flash memory type as remote control information. The switch command sets for plural electronic musical instrument models may be downloaded and stored as the remote control information for the plural models. Alternatively, switch commands for plural models may be assigned commonly to one switch.

In step S81 of FIG. 6(b), the user selects a model to be remotely operated. In step S82, the user selects the remote control mode. In step S83, the switch command corresponding to the operated control is obtained from the RAM or the ROM. In step S84, the switch command and the operation amount are converted into a communications format to provide a remote control signal. In step S85, the user executes a dial operation to connect to the destination electronic musical instrument 7 (FIG. 1). In step S86, the remote control signal is transmitted to the destination electronic musical instrument 7. It should be noted that, before step S81, the user may execute the dial operation to connect to the destination electronic musical instrument 7.

As described, the data communication based on mobile telephone terminals is normally executed by line exchange, but it may be executed by packet exchange in which packets are transmitted upon data transfer request. Packet exchange is preferred for an operation that does not require real-time processing.

As described above, the switch exclusive data of various electronic musical instrument controls are stored beforehand on the database server on the public communications network as exclusive messages. The stored exclusive messages are downloaded according to the model of the electronic musical instrument to be operated. The user allocates these switch exclusive data to the controls on the portable telephone terminal 8 by checking the data and controls on the display. Every time the user operates the associated controls, the user can output the corresponding switch exclusive data to the destination electronic musical instrument 7, thereby using the portable telephone terminal as a device for remotely controlling an electronic musical instrument.

The switch command transmitted from the portable telephone terminal 8 for remote operation is received by the destination electronic musical instrument 7. The received switch command is then analyzed to execute the corresponding operation. This allows the user to remotely turn on/off the electronic musical instrument, to start or stop performance, to edit timbres and so on. Because the switch commands execute these control operations through a portable telephone terminal via a public communications network, plural unspecified electronic musical instruments can be controlled remotely.

As with the type shown in FIG. 2(d), an electronic musical instrument capability may be added to the portable telephone terminal 8 for remote operation. However, for remote control alone, the hardware configuration remains the same as that of ordinary mobile telephone terminals, only requiring an increase in the storage sizes of the RAM or the ROM and a change in CPU programs.

With the portable telephone terminal 3 or the portable telephone terminal 8 for remote operation, only the wireless communications connection capability is used. Therefore, these telephone terminals may only be a mobile wireless terminal, which can be connected to a public communications network directly or indirectly. Namely, these telephone terminals are not limited to portable telephone terminals.

If each individual mobile wireless communications terminal is capable of individually communicating with a destination electronic musical instrument or a database server one-to-one basis by a leased line without using an exchange network, this capability may be used for remote operation.

In the above-mentioned examples, the portable telephone terminal 8 for remote operation remotely controls electronic musical instruments. If a data format such as the MIDI message switch exclusive data can be defined, the portable telephone terminal 8 may remotely control not only electronic musical instruments but also any other devices.

As described and according to the invention, electronic musical instruments can be easily connected to a public communications network, so that plural electronic musical instruments and database servers can be networked by use of a public communications network. Consequently, the music information such as music tone information, music control information, and music performance information can be effectively shared among electronic musical instruments.

In addition, by use of a public communications network, various electronic musical instruments connected to a public communications network can be remotely controlled and the remote control information can be downloaded by mobile wireless terminals such as portable telephone terminals including PHS terminals.

While the preferred embodiments of the present invention have been described using specific terms, such description is for illustrative purposes only, and it is to be understood that changes and variations may be made without departing from the spirit or scope of the appended claims.

What is claimed is:

1. An electronic musical instrument for processing music information associated to music tones and for coupling to a portable telephone terminal communicable with a public communication network, said electronic musical instrument comprising:
 a main block that processes music information for generation of music tones, the processed music information being transferable for effecting remote generation of the music tones;
 a coupling block that is provided for coupling with the portable telephone terminal;
 a memory block that is controlled for memorizing music information; and
 a control block that controls the memory block to memorize the processed music information and to feed the memorized music information to the portable telephone terminal through the coupling block,
 wherein music information received by the portable telephone terminal is transferred from the portable telephone terminal to the public communication network.

2. The electronic musical instrument according to claim 1, wherein the coupling block comprises a card slot provided for receiving therein a data communication card such that the portable telephone terminal is detachably coupled to the received data communication card by a connection cable.

3. The electronic musical instrument according to claim 1, wherein the coupling block comprises a card slot provided for receiving therein a card type of the portable telephone terminal such that the portable telephone terminal is detachably coupled to the card slot.

4. The electronic musical instrument according to claim 1, wherein the coupling block comprises a connector provided for engagement with another connector provided in the portable telephone terminal such that the portable telephone terminal is detachably coupled to the connector.

5. The electronic musical instrument according to claim 1, wherein the coupling block comprises a space portion provided for integrally accommodating therein the portable telephone terminal such that the portable telephone terminal is detachably coupled to the space portion.

6. The electronic musical instrument according to claim 1, wherein the memory block memorizes music information containing at least one of music tone information that characterizes the music tones, music control information that controls the generation of the music tones and music performance information that specifies a performance by the music tones.

7. An electronic musical instrument for processing music information associated to music tones and for coupling to a portable telephone terminal communicable with a public communication network, said electronic musical instrument comprising:
 a memory block that is controlled for memorizing music information;
 a coupling block that is provided for coupling with the portable telephone terminal, wherein the portable telephone terminal receives music information through the public communication network;
 a control block that receives the music information from the portable telephone terminal through the coupling block and feeds the music information to the memory block and that controls the memory block to memorize therein the fed music information; and
 a main block that processes the memorized music information for generation of music tones.

8. The electronic musical instrument according to claim 7, wherein the coupling block comprises a card slot provided for receiving therein a data communication card such that the portable telephone terminal is detachably coupled to the received data communication card by a connection cable.

9. The electronic musical instrument according to claim 7, wherein the coupling block comprises a card slot provided for receiving therein a card type of the portable telephone terminal such that the portable telephone terminal is detachably coupled to the card slot.

10. The electronic musical instrument according to claim 7, wherein the coupling block comprises a connector provided for engagement with another connector provided in the portable telephone terminal such that the portable telephone terminal is detachably coupled to the connector.

11. The electronic musical instrument according to claim 7, wherein the coupling block comprises a space portion provided for integrally accommodating therein the portable telephone terminal such that the portable telephone terminal is detachably coupled to the space portion.

12. The electronic musical instrument according to claim 7, wherein the memory block memorizes music information containing at least one of music tone information that characterizes the music tones, music control information that controls the generation of the music tones and music performance information that specifies a performance by the music tones.

13. An electronic musical instrument for processing music information associated to music tones and for coupling to a portable telephone terminal communicable with a public communication network, said electronic musical instrument comprising:
 a main block that processes music information for generation of music tones, the processed music information being transferable for effecting remote generation of the music tones;
 a coupling block for coupling to the portable telephone terminal; and
 a control block that controls the coupling block to feed the processed music information from the main block to the portable telephone terminal,
 wherein music information received by the portable telephone terminal is transferred from the portable telephone terminal to the public communication network.

14. The electronic musical instrument according to claim 13, wherein the coupling block comprises a card slot provided for receiving therein a data communication card such that the portable telephone terminal is detachably coupled to the received data communication card by a connection cable.

15. The electronic musical instrument according to claim 13, wherein the coupling block comprises a card slot provided for receiving therein a card type of the portable telephone terminal such that the portable telephone terminal is detachably coupled to the card slot.

16. The electronic musical instrument according to claim 13, wherein the coupling block comprises a connector provided for engagement with another connector provided in the portable telephone terminal such that the portable telephone terminal is detachably coupled to the coupling block by the pair of the connectors.

17. The electronic musical instrument according to claim 13, wherein the coupling block includes a space portion provided for integrally accommodating therein the portable telephone terminal such that the portable telephone terminal is detachably coupled to the coupling block.

18. The electronic musical instrument according to claim 13, wherein the main block processes music information containing at least one of music tone information that characterizes the music tones, music control information that controls the generation of the music tones and music performance information that specifies a performance by the music tones.

19. An electronic musical instrument for processing music information associated to music tones and for coupling to a portable telephone terminal communicable with a public communication network, said electronic musical instrument comprising:
 a coupling block for coupling to the portable telephone terminal, said portable telephone terminal receiving music information through the public communication network;
 a memory block that receives and memorizes the music information outputted from the coupling block; and
 a main block that processes the memorized music information for generation of music tones.

20. The electronic musical instrument according to claim 19, wherein the coupling block comprises a card slot provided for receiving therein a data communication card such that the portable telephone terminal is detachably coupled to the received data communication card by a connection cable.

21. The electronic musical instrument according to claim 19, wherein the coupling block comprises a card slot provided for receiving therein a card type of the portable telephone terminal such that the portable telephone terminal is detachably coupled to the card slot.

22. The electronic musical instrument according to claim 19, wherein the coupling block comprises a connector provided for engagement with another connector provided in the portable telephone terminal such that the portable telephone terminal is detachably coupled to the coupling block by the pair of the connectors.

23. The electronic musical instrument according to claim 19, wherein the coupling block includes a space portion provided for integrally accommodating therein the portable telephone terminal such that the portable telephone terminal is detachably coupled to the coupling block.

24. The electronic musical instrument according to claim 19, wherein the main block processes music information containing at least one of music tone information that characterizes the music tones, music control information that controls the generation of the music tones and music performance information that specifies a performance by the music tones.

25. A portable telephone terminal connectable to an electronic musical instrument that processes music information associated to music tones, said portable telephone terminal comprising:
 a communication block for communicating with a public communication network by a wireless line to receive music information from the public communication network;
 a coupling block for coupling to the electronic musical instrument; and
 a control block that passes the music information received by the communication block to the electronic musical instrument through the coupling block, whereby the electronic musical instrument processes the passed music information for generation of music tones.

26. The portable telephone terminal according to claim 25, wherein the coupling block utilizes a data communication card which can be received by a card slot provided in the electronic musical instrument such that the portable telephone terminal is detachably coupled to the received data communication card by a connection cable.

27. The portable telephone terminal according to claim 25, wherein the coupling block utilizes a card shape of the portable telephone terminal which can be received by a card slot provided in the electronic musical instrument such that the portable telephone terminal is detachably coupled to the card slot.

28. The portable telephone terminal according to claim 25, wherein the coupling block comprises a connector provided for engagement with another connector provided in the electronic musical instrument such that the portable telephone terminal is detachably coupled to the electronic musical instrument by the pair of the connectors.

29. The portable telephone terminal according to claim 25, wherein the coupling block utilizes a space portion provided in the electronic musical instrument for integrally accommodating the portable telephone terminal in the space portion such that the portable telephone terminal is detachably coupled to the electronic musical instrument.

30. The electronic musical instrument according to claim 25, wherein the communication block receives music information containing at least one of music tone information that characterizes the music tones, music control information that controls the generation of the music tones and music performance information that specifies a performance by the music tones.

31. A portable telephone terminal connectable to an electronic musical instrument which outputs music information usable for generation of music tones, comprising:
 a coupling block for coupling to the electronic musical instrument;
 a memory block that receives and memorizes the music information outputted by the electronic musical instrument through the coupling block; and
 a communication block for communicating with a public communication network by a wireless line to transmit the memorized music information to the public communication network for remote generation of music tones according to the transmitted music information.

32. The portable telephone terminal according to claim 31, wherein the coupling block utilizes a data communication card which can be received by a card slot provided in the electronic musical instrument such that the portable telephone terminal is detachably coupled to the received data communication card by a connection cable.

33. The portable telephone terminal according to claim 31, wherein the coupling block utilizes a card shape of the portable telephone terminal which can be received by a card slot provided in the electronic musical instrument such that the portable telephone terminal is detachably coupled to the card slot.

34. The portable telephone terminal according to claim 31, wherein the coupling block comprises a connector provided for engagement with another connector provided in the electronic musical instrument set such that the portable telephone terminal is detachably coupled to the electronic musical instrument by the pair of the connectors.

35. The portable telephone terminal according to claim 31, wherein the coupling block utilizes a space portion provided in the electronic musical instrument for integrally accommodating the portable telephone terminal in the space portion such that the portable telephone terminal is detachably coupled to the electronic musical instrument.

36. The electronic musical instrument according to claim 31, wherein the memory block memorizes music information containing at least one of music tone information that characterizes the music tones, music control information that controls the generation of the music tones and music performance information that specifies a performance by the music tones.

37. A system comprising an electronic musical instrument for processing music information associated to music tones, and a portable telephone terminal for transferring music information through a public communication network,
    wherein the electronic musical instrument comprises:
    a main block that processes music information for generation of music tones, the processed music information being transferable for effecting remote generation of the music tones;
    a coupling block that is used for coupling with the portable telephone terminal; and
    a control block that controls the coupling block to feed the processed music information from the main block to the portable telephone terminal, and
    wherein the portable telephone terminal comprises:
    a coupling block that is used for the coupling with the electronic musical instrument;
    a memory block that receives and memorizes the music information fed from the electronic musical instrument through the coupling block; and
    a communication block that for communicating with the public communication network by a wireless line to transmit the memorized music information to the public communication network for remote generation of music tones according to the transmitted music information.

38. The system according to claim 37, wherein the main block processes the music information containing at least one of music tone information that characterizes the music tones, music control information that controls the generation of the music tones and music performance information that specifies a performance by the music tones.

39. A system comprising a portable telephone terminal which can acquire music information from a public communication network, and an electronic musical instrument for processing music information associated to music tones,
    wherein the portable telephone terminal comprises:
    a communication block for communicating with the public communication network by a wireless line to acquire music information from the public communication network;
    a coupling block that is used for coupling to the electronic musical instrument; and
    a control block that passes the music information acquired by the communication block to the electronic musical instrument through the coupling block, and
    wherein the electronic musical instrument comprises:
    a coupling block that is used for coupling to the portable telephone terminal,
    a memory block that receives and memorizes the passed music information through the coupling block; and
    a main block that processes the memorized music information for generation of music tones.

40. The system according to claim 39, wherein the main block processes the music information containing at least one of music tone information that characterizes the music tones, music control information that controls the generation of the music tones and music performance information that specifies a performance by the music tones.

41. A mobile wireless terminal set for remote controlling over functions of an electronic musical instrument through a public communication network, said mobile wireless terminal comprising:
    a communication block for connecting with the public communication network by a wireless line to transmit information:
    a first control that is operable to generate first control information effective to control the communication block;
    a setting block that allocates a function of the electronic musical instrument to the first control;
    a converting block that converts the first control information generated by the operation of the first control into second control information, which is equivalent to control information generated by a second control equipped in the electronic musical instrument for controlling of the function of the electronic musical instrument; and
    a control block that controls the communication block to direct the second control information to the electronic musical instrument through the public communication network, thereby executing the remote control of the function of the electronic musical instrument by means of the first control.

42. The mobile wireless terminal set according to claim 41, further comprising a coupling block that utilizes a data communication card which can be received by a card slot provided in an electronic musical instrument such that the mobile wireless communication set is detachably coupled to the received data communication card by a connection cable.

43. The mobile wireless terminal set according to claim 41, further comprising a coupling block that utilizes a card shape of the mobile wireless terminal set which can be received by a card slot provided in an electronic musical instrument such that the mobile wireless terminal set is detachably coupled to the card slot.

44. The mobile wireless terminal set according to claim 41, further comprising a coupling block composed of a connector provided for engagement with another connector provided in an electronic musical instrument such that the mobile wireless terminal set is detachably coupled to an electronic musical instrument by the pair of the connectors.

45. The mobile wireless terminal set according to claim 41, further comprising a coupling block that utilizes a space portion provided in an electronic musical instrument for integrally accommodating the mobile wireless terminal set in the space portion such that the mobile wireless terminal set is detachably coupled to the electronic musical instrument.

46. A mobile wireless terminal set for remotely controlling over functions of an electronic musical instrument through a public communication network, said mobile wireless terminal comprising:
    a communication block for connecting with the public communication network by a wireless line to receive and transmit information:
    a first control that is operable to generate first control information effective to control the communication block;
    a control block that controls the communication block to acquire allocation information representing allocation of a function of the electronic musical instrument to a second control equipped in the electronic musical instrument; and a setting block that allocates the function of the electronic musical instrument to the first control according to the acquired allocation information, thereby enabling the remote control of the function of the electronic musical instrument by means of the first control through the public communication network.

47. The mobile wireless terminal set according to claim 46, further comprising a coupling block that utilizes a data communication card which can be received by a card slot provided in an electronic musical instrument such that the mobile wireless communication set is detachably coupled to the received data communication card by a connection cable.

48. The mobile wireless terminal set according to claim 46, further comprising a coupling block that utilizes a card shape of the mobile wireless terminal set which can be received by a card slot provided in an electronic musical instrument such that the mobile wireless terminal set is detachably coupled to the card slot.

49. The mobile wireless terminal set according to claim 46, further comprising a coupling block composed of a connector provided for engagement with another connector provided in an electronic musical instrument such that the mobile wireless terminal set is detachably coupled to an electronic musical instrument by the pair of the connectors.

50. The mobile wireless terminal set according to claim 46, further comprising a coupling block that utilizes a space portion provided in an electronic musical instrument for integrally accommodating the mobile wireless terminal set in the space portion such that the mobile wireless terminal set is detachably coupled to the electronic musical instrument.

51. An electronic musical instrument for processing music information associated to music tones and for coupling to a portable telephone terminal communicable with a public communication network, said electronic musical instrument comprising:

a coupling block for coupling to the portable telephone terminal for downloading music information from a database server through the public communication network;

a memory block that receives and stores the downloaded music information outputted from the coupling block; and a main block that processes the memorized music information for generation of music tones.

52. The electronic musical instrument according to claim 51, wherein the coupling block comprises a card slot provided for receiving therein a data communication card such that the portable telephone terminal is detachably coupled to the received data communication card by a connection cable.

53. The electronic musical instrument according to claim 51, wherein the coupling block comprises a card slot provided for receiving therein a card type of the portable telephone terminal such that the portable telephone terminal is detachably coupled to the card slot.

54. The electronic musical instrument according to claim 51, wherein the coupling block comprises a connector provided for engagement with another connector provided in the portable telephone terminal such that the portable telephone terminal is detachably coupled to the coupling block by the pair of the connectors.

55. The electronic musical instrument according to claim 51, wherein the coupling block includes a space portion provided for integrally accommodating therein the portable telephone terminal such that the portable telephone terminal is detachably coupled to the coupling block.

56. The electronic musical instrument according to claim 51, wherein the main block processes music information containing at least one of music tone information that characterizes the music tones, music control information that controls the generation of the music tones and music performance information that specifies a performance by the music tones.

57. An electronic musical instrument for processing music information associated to music tones and for coupling to a portable telephone terminal communicable with a public communication network, comprising:

a main block that processes music information for generation of music tones;

a memory block that stores the processed music information;

a coupling block for coupling to the portable telephone terminal connectable to a database server through the public communication network; and a control block that controls the memory block to pass the stored music information to the coupling block and that controls the coupling block to upload the passed music information to the database server from the portable telephone terminal through the public communication network.

58. The electronic musical instrument according to claim 57, wherein the coupling block comprises a card slot provided for receiving therein a data communication card such that the portable telephone terminal is detachably coupled to the received data communication card by a connection cable.

59. The electronic musical instrument according to claim 57, wherein the coupling block comprises a card slot provided for receiving therein a card type of the portable telephone terminal such that the portable telephone terminal is detachably coupled to the card slot.

60. The electronic musical instrument according to claim 57, wherein the coupling block comprises a connector provided for engagement with another connector provided in the portable telephone terminal such that the portable telephone terminal is detachably coupled to the coupling block by the pair of the connectors.

61. The electronic musical instrument according to claim 57, wherein the coupling block includes a space portion provided for integrally accommodating therein the portable telephone terminal such that the portable telephone terminal is detachably coupled to the coupling block.

62. The electronic musical instrument according to claim 57, wherein the main block processes music information containing at least one of music tone information that characterizes the music tones, music control information that controls the generation of the music tones and music performance information that specifies a performance by the music tones.

63. A system comprising:

an electronic musical instrument for processing music information associated to music tones;

a portable telephone terminal for coupling to the electronic musical instrument and communicating with a public communication network; and a database server that stores music information, said database server operatively coupled to a public communication network, wherein the electronic musical instrument comprises:

a coupling block for coupling to the portable telephone terminal for downloading the music information from the database server through the public communication network, said portable telephone terminal communicating with the database server through the public communication network;

a memory block that receives and stores the downloaded music information outputted from the coupling block; and a main block that processes the memorized music information for generation of music tones.

64. The system according to claim 63, wherein the main block processes the music information containing at least one of music tone information that characterizes the music tones, music control information that controls the generation of the music tones and music performance information that specifies a performance by the music tones.

65. A system comprising:

an electronic musical instrument for processing music information associated to music tones;

a portable telephone terminal operatively coupled to the electronic musical instrument and a public communication network; and a database server operatively coupled to the public communication network, said database server having stored music information accessible via the public communication network, wherein the electronic musical instrument comprises:

a main block that processes music information for generation of music tones;

a memory block that stores the processed music information;

a coupling block for coupling to the portable telephone terminal; and a control block that controls the memory block to pass the stored music information to the coupling block and that controls the coupling block to upload the passed music information to the database server from the portable telephone terminal through the public communication network.

66. The system according to claim 65, wherein the main block processes the music information containing at least one of music tone information that characterizes the music tones, music control information that controls the generation of the music tones and music performance information that specifies a performance by the music tones.

67. An electronic musical instrument for processing music information associated to music tones and for coupling to a portable telephone terminal communicable with a public communication network, said electronic musical instrument comprising:

a coupling block for coupling to the portable telephone terminal for accessing another electronic musical instrument storing music information through the public communication network;

a control block that controls the coupling block to enable the portable telephone terminal to download the music information from said another electronic musical instrument;

a memory block that stores the downloaded music information outputted from the coupling block; and a main block that processes the stored music information for generation of music tones.

68. The electronic musical instrument according to claim 67, wherein the coupling block comprises a card slot provided for receiving therein a data communication card such that the portable telephone terminal is detachably coupled to the received data communication card by a connection cable.

69. The electronic musical instrument according to claim 67, wherein the coupling block comprises a card slot provided for receiving therein a card type of the portable telephone terminal such that the portable telephone terminal is detachably coupled to the card slot.

70. The electronic musical instrument according to claim 67, wherein the coupling block comprises a connector provided for engagement with another connector provided in the portable telephone terminal such that the portable telephone terminal is detachably coupled to the coupling block by the pair of the connectors.

71. The electronic musical instrument according to claim 67, wherein the coupling block includes a space portion provided for integrally accommodating therein the portable telephone terminal such that the portable telephone terminal is detachably coupled to the coupling block.

72. The electronic musical instrument according to claim 67, wherein the main block processes music information containing at least one of music tone information that characterizes the music tones, music control information that controls the generation of the music tones and music performance information that specifies a performance by the music tones.

73. An electronic musical instrument for processing music information associated to music tones and for coupling to a portable telephone terminal communicable with a public communication network, said electronic musical instrument comprising:

a main block that processes music information for generation of music tones;

a memory block that stores the processed music information;

a coupling block for coupling to the portable telephone terminal which is in turn connected to another electronic musical instrument through the public communication network; and a control block that controls the memory block to pass the stored music information to the coupling block and that controls the coupling block to upload the passed music information to said another electronic musical instrument from the portable telephone terminal through the public communication network.

74. The electronic musical instrument according to claim 73, wherein the coupling block comprises a card slot provided for receiving therein a data communication card such that the portable telephone terminal is detachably coupled to the received data communication card by a connection cable.

75. The electronic musical instrument according to claim 73, wherein the coupling block comprises a card slot provided for receiving therein a card type of the portable telephone terminal such that the portable telephone terminal is detachably coupled to the card slot.

76. The electronic musical instrument according to claim 73, wherein the coupling block comprises a connector provided for engagement with another connector provided in the portable telephone terminal such that the portable telephone terminal is detachably coupled to the coupling block by the pair of the connectors.

77. The electronic musical instrument according to claim 73, wherein the coupling block includes a space portion provided for integrally accommodating therein the portable telephone terminal such that the portable telephone terminal is detachably coupled to the coupling block.

78. The electronic musical instrument according to claim 73, wherein the main block processes music information containing at least one of music tone information that characterizes the music tones, music control information that controls the generation of the music tones and music performance information that specifies a performance by the music tones.

79. A system comprising:
a first electronic musical instrument for processing music information associated to music tones;
a portable telephone terminal operatively coupled to the first electronic musical instrument and a public communication network; and
a second electronic musical instrument that stores music information and connectable by the portable telephone terminal through the public communication network, wherein the first electronic musical instrument comprises:
a coupling block for coupling to the portable telephone terminal and for downloading the music information from the second electronic musical instrument through the public communication network;
a memory block that receives and stores the downloaded music information outputted from the coupling block; and
a main block that processes the stored music information for generation of music tones.

80. The system according to claim 79, wherein the main block processes the music information containing at least one of music tone information that characterizes the music tones, music control information that controls the generation of the music tones and music performance information that specifies a performance by the music tones.

81. A system comprising:
a first electronic musical instrument for processing music information associated to music tones;
a portable telephone terminal operatively coupled to the first electronic musical instrument and a public communication network; and
a second electronic musical instrument operatively coupled the public communication network, wherein the first electronic musical instrument comprises:
a main block that processes music information for generation of music tones;
a memory block that stores the processed music information;
a coupling block for coupling to the portable telephone terminal; and
a control block that controls the memory block to pass the stored music information to the coupling block and that controls the coupling block to transfer the passed music information to the second electronic musical instrument from the portable telephone terminal through the public communication network.

82. The system according to claim 81, wherein the main block processes the music information containing at least one of music tone information that characterizes the music tones, music control information that controls the generation of the music tones and music performance information that specifies a performance by the music tones.

83. A portable telephone terminal connectable to an electronic musical instrument which outputs music information usable for generation of music tones, said portable telephone terminal comprising:
a coupling block for coupling to the electronic musical instrument to receive therefrom the music information;
a memory block that memorizes the music information received by the coupling block;
a converting block that converts the memorized music information into a format suitable for transfer by a wireless line; and
a communication block for communicating with a public communication network by a wireless line, wherein the converted music information is transferred to the public communication network.

84. The portable telephone terminal according to claim 83, wherein the coupling block utilizes a data communication card which can be received by a card slot provided in the electronic musical instrument such that the portable telephone terminal is detachably coupled to the received data communication card by a connection cable.

85. The portable telephone terminal according to claim 83, wherein the coupling block utilizes a card shape of the portable telephone terminal which can be received by a card slot provided in the electronic musical instrument such that the portable telephone terminal is detachably coupled to the card slot.

86. The portable telephone terminal according to claim 83, wherein the coupling block comprises a connector provided for engagement with another connector provided in the electronic musical instrument such that the portable telephone terminal is detachably coupled to the electronic musical instrument by the pair of the connectors.

87. The portable telephone terminal according to claim 83, wherein the coupling block utilizes a space portion provided in the electronic musical instrument for integrally accommodating the portable telephone terminal in the space portion such that the portable telephone terminal is detachably coupled to the electronic musical instrument.

88. The electronic musical instrument according to claim 83, wherein the memory block memorizes the music information containing at least one of music tone information that characterizes the music tones, music control information that controls the generation of the music tones and music performance information that specifies a performance by the music tones.

89. A method of operating an electronic musical instrument for processing music information associated to music tones, said electronic musical instrument including a memory said electronic musical instrument operatively connectable to a portable telephone terminal communicable with a public communication network, the method comprising the steps of:
processing music information in the electronic musical instrument to generate music tones, wherein the processed music information is transferable for effecting remote generation of the music tones;
connecting the electronic musical instrument to the portable telephone terminal;
controlling the memory to memorize the processed music information;
feeding the memorized music information from the memory to the portable telephone terminal; and
transferring music information from the portable telephone terminal to the public communication network.

90. A method of operating an electronic musical instrument which processes music information associated to music tones and which is operatively coupled to a portable telephone terminal communicable with a public communication network, said electronic musical instrument including a memory, the method comprising the steps of:
coupling the electronic musical instrument to the portable telephone terminal for receiving music information through the public communication network;
receiving music information from the portable telephone terminal through the public communication network;
feeding the music information to the memory;
controlling the memory to memorize therein the fed music information; and processing the memorized music information in the electronic musical instrument for generation of music tones.

91. A method of operating an electronic musical instrument which processes music information associated to music tones and which is operatively coupled to a portable telephone terminal communicable with a public communication network, the method comprising the steps of:
 processing music information in the electronic musical instrument to generate music tones;
 coupling the electronic musical instrument to the portable telephone terminal; and
 controlling the electronic musical instrument to feed the processed music information to the portable telephone terminal to transfer of the music information from the portable telephone terminal to the public communication network,
 wherein the processed music information transferred effects remote generation of music tones.

92. A method of operating an electronic musical instrument which processes music information associated to music tones and which is coupled to a portable telephone terminal communicable with a public communication network, the method comprising the steps of:
 connecting the electronic musical instrument to the portable telephone terminal for receiving music information through the public communication network;
 memorizing the music information received by the portable telephone terminal in a memory provided in the electronic musical instrument; and
 processing the memorized music information in the electronic musical instrument for generation of music tones.

93. A method of operating a portable telephone terminal connectable to an electronic musical instrument which processes music information associated to music tones, the method comprising the steps of:
 communicating with a public communication network by the portable telephone terminal to receive music information from the public communication network;
 coupling the portable telephone terminal to the electronic musical instrument; and
 passing the music information received by the portable telephone terminal to the electronic musical instrument, whereby the electronic musical instrument processes the passed music information for generation of music tones.

94. A method of operating a portable telephone terminal connectable to an electronic musical instrument which outputs music information usable for generation of music tones, the method comprising the steps of:
 coupling the portable telephone terminal to the electronic musical instrument;
 receiving and memorizing the music information outputted by the electronic musical instrument in a memory provided in the portable telephone terminal; and
 communicating with a public communication network by the portable telephone terminal to transmit the memorized music information to the public communication network,
 wherein the transmitted memorized music information causes remote generation of music tones according to the transmitted music information.

95. A method of using a system comprising an electronic musical instrument which processes music information associated to music tones, and a portable telephone terminal which transfers music information through a public communication network, the method comprising the steps of:
 processing music information in the electronic musical instrument to generate music tones;
 connecting the electronic musical instrument with the portable telephone terminal;
 feeding the processed music information from the electronic musical instrument to the portable telephone terminal;
 memorizing the music information fed from the electronic musical instrument in a memory provided in the portable telephone terminal; and
 communicating with the public communication network by the portable telephone terminal to transmit the memorized music information to the public communication network for remote generation of music tones according to the transmitted music information.

96. A method of operating a system comprising a portable telephone terminal, said portable telephone terminal acquires music information from a public communication network, and an electronic musical instrument which processes music information associated to music tones, the method comprising the steps of:
 communicating with the public communication network by the portable telephone terminal to acquire music information from the public communication network;
 coupling the portable telephone terminal to the electronic musical instrument;
 passing the music information acquired by the portable telephone terminal to the electronic musical instrument through said step of coupling;
 memorizing the passed music information in a memory provided in the electronic musical instrument; and
 processing the memorized music information in the electronic musical instrument for generation of music tones.

97. A method of operating a mobile wireless terminal set for remotely controlling over functions of an electronic musical instrument through a public communication network, the method comprising the steps of:
 allocating a function of the electronic musical instrument to a first control that is operable to generate first control information effective to control the mobile wireless terminal set;
 converting the first control information generated by the first control into second control information, which is equivalent to control information generated by a second control equipped in the electronic musical instrument for controlling of the function of the electronic musical instrument;
 operating the mobile wireless terminal set to connect with the public communication network by a wireless line to transmit information; and
 controlling the mobile wireless terminal set to direct the second control information to the electronic musical instrument through the public communication network, thereby executing the remote control of the function of the electronic musical instrument by means of the first control.

98. A method of operating a mobile wireless terminal set to remotely control over functions of an electronic musical instrument through a public communication network, the method comprising the steps of:
 connecting the mobile wireless terminal set with the public communication network by a wireless line to receive and transmit information, the mobile wireless terminal set having a first control that is operable to generate first control information effective to control the mobile wireless terminal set;
 controlling the mobile wireless terminal set to acquire allocation information representing allocation of a function of the electronic musical instrument to a second control equipped in the electronic musical instrument; and allocating the function of the electronic musical instrument to the first control according to the acquired allocation information, thereby enabling the remote control of the function of the electronic musical instrument by means of the first control through the public communication network.

99. A method of operating an electronic musical instrument which processes music information associated to music tones and which is operatively coupled to a portable telephone terminal communicable with a public communication network, the method comprising the steps of:

coupling the electronic musical instrument to the portable telephone terminal;

receiving downloaded music information from the portable telephone terminal to store the downloaded music information in a memory provided in the electronic musical instruments wherein said downloaded music information is received from a database server that is connected to the public communication network; and processing the memorized music information in the electronic musical instrument for generation of music tones.

100. A method of operating an electronic musical instrument which processes music information associated to music tones and is operatively coupled to a portable telephone terminal communicable with a public communication network, the method comprising the steps of:

processing music information in the electronic musical instrument for generation of music tones;

storing the processed music information in a memory equipped in the electronic musical instrument;

connecting the electronic musical instrument to a database server through the portable telephone terminal that is communicable with the public communication network;

controlling the memory to pass the stored music information to the portable telephone terminal; and controlling the portable telephone terminal to upload the passed music information to the database server through the public communication network.

101. A method of operating a system comprising an electronic musical instrument that processes music information associated to music tones, a portable telephone terminal that is operatively coupled to the electronic musical instrument, said portable telephone terminal communicating with a public communication network, and a database server that stores music information and that is operatively coupled to the public communication network, the method comprising the steps of:

operating the portable telephone terminal to download the music information from the database server through the public communication network;

storing the downloaded music information outputted from the portable telephone terminal in a memory equipped in the electronic musical instrument; and processing the memorized music information in the electronic musical instrument to generate music tones.

102. A method of operating a system comprising an electronic musical instrument that processes music information associated to music tones, a portable telephone terminal operatively coupled to the electronic musical instrument and a public communication network, and a database server that is connected to the public communication network, said database server having stored music information, the method comprising the steps of:

processing music information in the electronic musical instrument to generate music tones;

storing the processed music information in a memory equipped in the electronic musical instrument;

coupling the electronic musical instrument to the portable telephone terminal;

controlling the memory to pass the stored music information to the portable telephone terminal; and controlling the portable telephone terminal to upload the passed music information to the database server through the public communication network.

103. A method of operating an electronic musical instrument which processes music information associated to music tones and which is connectable to a portable telephone terminal communicable with a public communication network, said portable telephone terminal connected to another electronic musical instrument having stored music information the method comprising the steps of:

connecting the electronic musical instrument to the portable telephone terminal;

controlling the portable telephone terminal to download the music information from said another electronic musical instrument;

storing the downloaded music information outputted from the portable telephone terminal in a memory equipped in the electronic musical instrument; and processing the stored music information by the electronic musical instrument for generation of music tones.

104. A method of operating an electronic musical instrument which processes music information associated to music tones and which is connectable to a portable telephone terminal communicable with a public communication network, the method comprising the steps of:

processing music information by the electronic musical instrument to generate music tones;

storing the processed music information in a memory equipped in the electronic musical instrument;

coupling the electronic musical instrument to the portable telephone terminal which is in turn connected to another electronic musical instrument through the public communication network;

controlling the memory of the electronic musical instrument to pass the stored music information to the portable telephone terminal; and controlling the portable telephone terminal to upload the passed music information to said another electronic musical instrument through the public communication network.

105. A method of operating a system comprising a first electronic musical instrument that processes music information associated to music tones, a portable telephone terminal that operatively coupled to the first electronic musical instrument and a public communication network, and a second electronic musical instrument that stores music information and operatively coupled to the portable telephone terminal through the public communication network, the method comprising the steps of:

operating the portable telephone terminal to download the music information from the second electronic musical instrument through the public communication network;

storing the downloaded music information outputted from the portable telephone terminal in a memory equipped in the first electronic musical instrument; and processing the stored music information by the first electronic musical instrument to generate music tones.

106. A method of operating a system comprising a first electronic musical instrument that processes music information associated to music tones, a portable telephone terminal operatively coupled to the first electronic musical instrument and a public communication network, and a second electronic musical instrument operatively coupled to the public communication network, the method comprising the steps of:

processing music information by the first electronic musical instrument to generate music tones;

storing the processed music information in a memory equipped in the first electronic musical instrument;

controlling the first electronic musical instrument to pass the stored music information from the memory to the portable telephone terminal; and controlling the portable telephone terminal to transfer the passed music information to the second electronic musical instrument through the public communication network.

107. A method of operating a portable telephone terminal connectable to an electronic musical instrument which outputs music information usable for generation of music tones, the method comprising the steps of:

connecting the portable telephone terminal to the electronic musical instrument to receive therefrom the music information;

memorizing the received music information in a memory equipped in the portable telephone terminal;

converting the memorized music information into a format suitable for transfer by a wireless line; and communicating with a public communication network by the wireless line to transfer the converted music information to the public communication network.

* * * * *